(12) United States Patent
Lell

(10) Patent No.: US 6,739,362 B2
(45) Date of Patent: May 25, 2004

(54) HYBRID-GAS GENERATOR, IN PARTICULAR FOR FILLING A GAS BAG

(76) Inventor: Peter Lell, Am Mühlbachbogen 85, D-85368 Moosburg (DE)

(*) Notice: Subject to any disclaimer, the term of this patent is extended or adjusted under 35 U.S.C. 154(b) by 0 days.

(21) Appl. No.: 10/297,881

(22) PCT Filed: Jun. 8, 2001

(86) PCT No.: PCT/DE01/02135
§ 371 (c)(1),
(2), (4) Date: Apr. 14, 2003

(87) PCT Pub. No.: WO01/94161
PCT Pub. Date: Dec. 13, 2001

(65) Prior Publication Data
US 2003/0150519 A1 Aug. 14, 2003

(30) Foreign Application Priority Data
Jun. 9, 2000 (DE) .......................... 100 28 169

(51) Int. Cl.⁷ ................................ B65B 1/04
(52) U.S. Cl. .................. 141/313; 280/734; 102/530; 141/98
(58) Field of Search ................. 141/114, 313, 141/98, 10, 19; 280/734, 735, 736, 737, 741; 137/68.13; 102/530, 531

(56) References Cited

U.S. PATENT DOCUMENTS 5,553,889 A * 9/1996 Hamilton et al. ........... 280/736
6,010,153 A * 1/2000 Halas et al. ................. 280/737
6,131,948 A * 10/2000 Cuevas ........................ 280/737
6,447,008 B1 * 9/2002 Karlin et al. ................ 280/741

FOREIGN PATENT DOCUMENTS

| DE | 196 02 009 A | 7/1997 |
| EP | 0 805 071 A | 11/1997 |
| GB | 2 264 772 A | 9/1993 |

* cited by examiner

*Primary Examiner*—Steven O. Douglas
(74) *Attorney, Agent, or Firm*—Shaffer & Culbertson, L.L.P.

(57) ABSTRACT

The invention relates to a hybrid gas generator, in particular for filling a gas bag, comprising a combustion chamber (3) which contains a predetermined amount of a gas generating material (11) and which comprises an outlet opening of the combustion chamber, further comprising an activating device (9) for activating the gas generating material (11) and further comprising a gas vessel (5) containing a stored gas, which is connected with the combustion chamber (3) via the outlet opening of the combustion chamber, which is sealed off in the initial state, and which comprises at least one outlet opening (25) for the gas mixture which is sealed off by means of an outlet membrane (23) in the initial state. The gas that is generated in the combustion chamber (3) after the gas generating material (11) has been activated acts upon a projectile (29) via the outlet opening of the combustion chamber, which projectile is accelerated by the gas pressure and destroys the outlet membrane (23), whereby the gas mixture consisting of the gas generated and the stored gas escapes from the outlet opening (25).

29 Claims, 2 Drawing Sheets

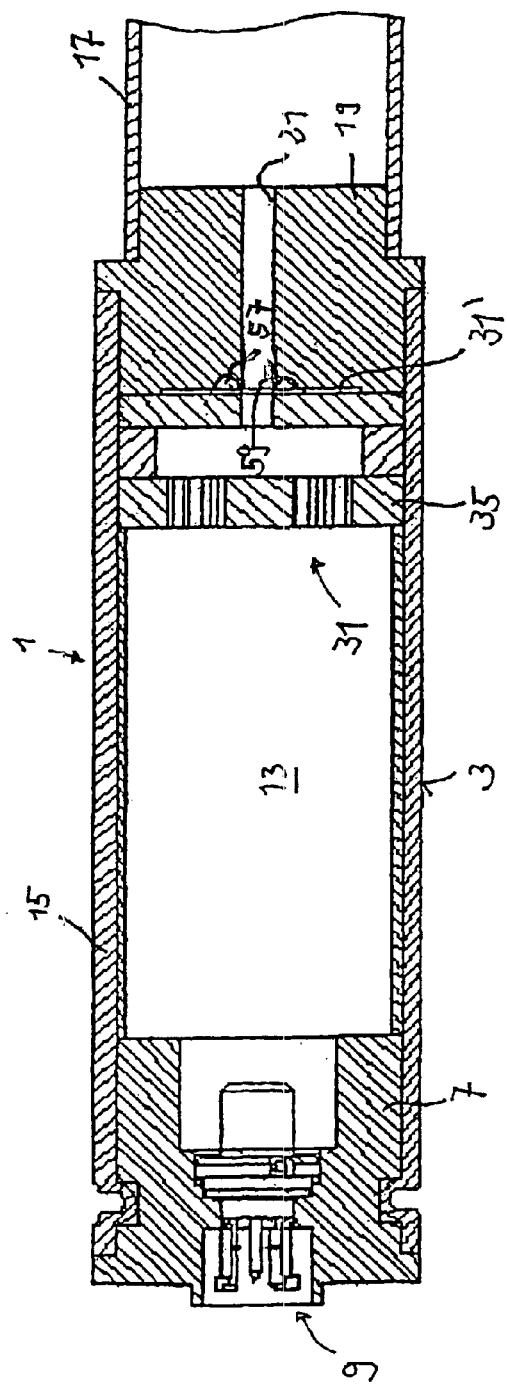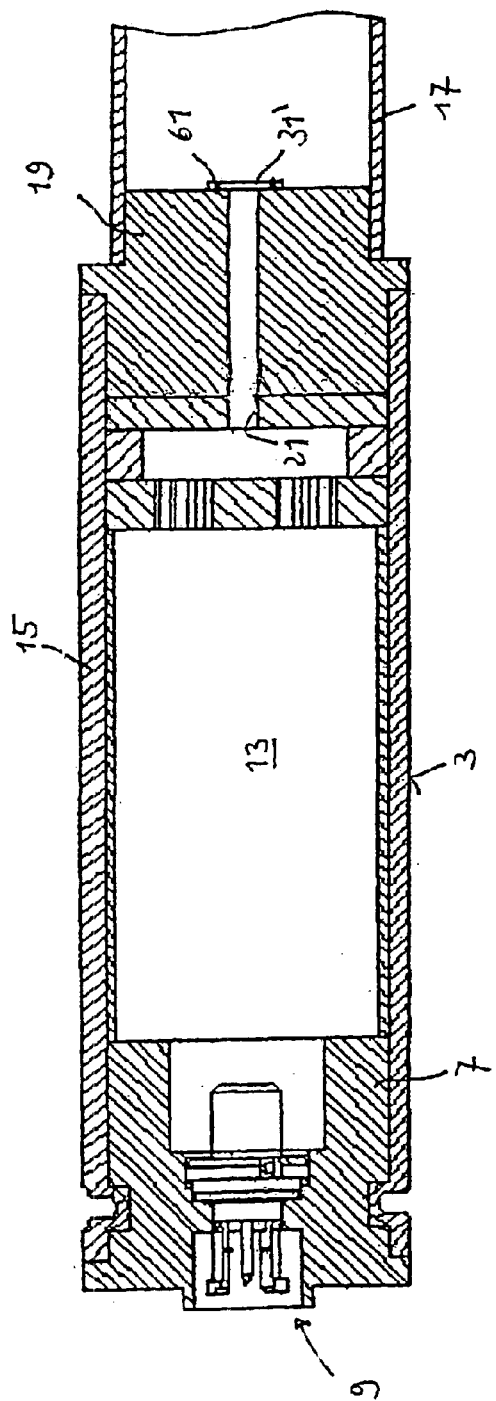

HYBRID-GAS GENERATOR, IN PARTICULAR FOR FILLING A GAS BAG

TECHNICAL FIELD OF THE INVENTION

The invention relates to a hybrid gas generator, in particular for filling a gas bag, for example, an air bag for an automotive vehicle.

BACKGROUND OF THE INVENTION

Hybrid gas generators are known in various embodiments. A hybrid gas generator is characterized by a gas generating substance, mostly in the form of a pyrotechnic propellant charge provided in a combustion chamber, and by a gas vessel which contains a suitable stored gas such as argon with a small portion of helium. The solid or liquid gas generating material may be activated via an ignition unit, which is mostly configured to be electrically controllable, with gas being generated in the combustion chamber which contains the gas generating material. In known hybrid gas generators, the combustion chamber, which is usually sealed off from the gas vessel at the beginning, is configured such that the gas generated in the combustion chamber actuates a unit which opens the combustion chamber and the gas vessel in order to allow the gas generated in the combustion chamber and the stored gas contained in the gas vessel to escape. Preferably, the two types of gas are mixed with each other on this occasion.

A hybrid gas generator of this kind is known from the document DE 196 02 009 A1, for example. This gas generator comprises a combustion chamber with an outlet opening in which a projectile is arranged. As soon as a predetermined pressure is exceeded in the combustion chamber, the projectile held in the outlet opening by positive locking or via an adhesive bond is ejected. The combustion chamber is coaxially arranged inside a gas vessel for the stored gas, and the gas vessel comprises a bursting membrane in the direction of ejection of the projectile, which can be destroyed by the projectile. In this way, a mixture of the gas generated inside the combustion chamber and of the stored gas contained in the gas vessel escapes from the outlet opening of the gas vessel.

What is disadvantageous in this embodiment of a hybrid gas generator is the fact that the response time passing between the ignition of the gas generating material in the combustion chamber and the escape of gas from the gas vessel is not defined exactly, because the response time particularly depends on the threshold pressure at which the projectile is ejected from the outlet opening of the combustion chamber. Usually, holding the projectile by positive locking or glueing it to the outlet opening does not make it possible to keep a defined threshold pressure, at which the projectile is ejected, with the required exacting tolerances.

Furthermore, the coaxial arrangement of the combustion chamber inside the gas vessel is disadvantageous whenever a design of the gas generator is required which is slim, but extended in the axial direction.

From the document EP 0 776 800 A2, a hybrid gas generator is known in which the gas vessel with the stored gas is arranged adjacent the combustion chamber in the axial direction. Here, too, the outlet opening of the combustion chamber is closed by a projectile, which is acted upon by the pressure of the gas generated inside the combustion chamber. The gas vessel also comprises a bursting element in the direction of flight of the projectile, which is destroyed when it is hit by the projectile and unblocks the outlet opening of the gas vessel.

With this embodiment of a hybrid gas generator, it is to be assumed that the axial extent of the gas vessel may only be relatively small, as otherwise no sufficient hitting accuracy of the projectile on the bursting element can be guaranteed.

In this reference, the use of an additional metal foil for sealing the outlet opening of the combustion chamber is mentioned, with this foil being provided on the back side of the projectile and connected with the corresponding wall of the combustion chamber. Apart from this sealing function, no other indications regarding the function of this foil are to be found in this reference.

SUMMARY OF THE INVENTION

An object of the invention is to provide a hybrid gas generator, in particular for filling a gas bag, which guarantees a high degree of functional safety and a very fast and defined response time.

The invention is based on the idea that a membrane for closing the outlet opening of the combustion chamber can be dimensioned in such a way that a destruction of the membrane as a result of the pressure of the gas in the combustion chamber acting thereon is guaranteed within very exacting tolerances around a predetermined threshold pressure. As a result, a projectile provided in a guide channel is not acted upon by pressure until the threshold pressure inside the combustion chamber has been exceeded. For this reason, there is no risk that the projectile is moved out of its starting position as a result of the pressure of the gas generated in the combustion chamber below the threshold pressure or that the forces fixing the projectile in the guide channel are influenced. Thus, the influence of all ignition or inflaming processes on the projectile is eliminated. Accordingly, the response time passing until the projectile is ejected from the guide channel, depending on the increase in pressure inside the combustion chamber, can be kept in very narrow bounds. As the barrel length (i.e. the effective length of the guide channel guiding the projectile until it is ejected, which acts as a barrel for the projectile) determines the final speed of the projectile together with the pressure acting thereon in the guide channel, the response time passing until the outlet membrane of the gas vessel is destroyed can be exactly met. The accuracy of the trajectory of the projectile can be further increased if the guide channel is provided with grooves similar to a gun barrel.

In another embodiment of the invention, no projectile is separately provided in or at the outlet opening of the combustion chamber or in the guide channel. In this case, a membrane is used which is configured such that the part of the membrane closing the cross-section of the guide channel is broken out of the membrane substantially in one piece if a predetermined threshold pressure of the gas generated in the combustion chamber is exceeded; the part that has been broken out acts as a projectile. The part broken out may be thickened compared to the residual portion of the membrane. In any case, it must be ensured that the part broken out has such a mass that the kinetic energy of this projectile is sufficient to destroy the outlet membrane of the gas vessel when the projectile hits it.

This embodiment has the advantage of a very easy manufacture of the hybrid gas generator.

The membrane may be provided at the end of the guide channel on the side of the combustion chamber or inside the guide channel; the portion of the guide channel between the position of the membrane and the end of the guide channel serves as a barrel for guiding the part of the membrane that forms the projectile. Hereby, the final speed of the projectile may be kept in very narrow bounds.

The membrane may be acted upon by shearing edges on the front side opposite to the combustion chamber. Hereby, breaking out of the membrane part within the cross-section of the guide channel in one piece is facilitated. This, too, contributes to the breaking out of the membrane part forming the projectile within exacting tolerances around the desired threshold pressure.

The membrane may also be provided on the front side of the guide channel opposite the combustion chamber.

In this case, the barrel length is zero. For this reason, this embodiment is the obvious choice particularly for short distances between the membrane from which the projectile is broken out and the outlet membrane to be destroyed, because in this case, as a result of the barrel length of zero, the hitting accuracy and the time of flight of the projectile until it hits the outlet membrane is reduced as compared to the embodiments mentioned before. The problem of the hitting accuracy can be solved by providing guiding surfaces which guide the projectile towards the outlet membrane to be destroyed, if this should be necessary.

According to an embodiment, the membrane from which the projectile is to be broken out may be provided with a corresponding predetermined breaking point which has a closed, ring-shaped configuration. This breaking point may be a closed, ring-shaped groove or notch, for example. In the embodiment in which the membrane is arranged on the front side of the guide channel opposite the combustion chamber, the membrane may be connected with the corresponding front side of the guide channel by means of a ring-shaped weld. In this case, the edge portion of the weld on the inside constitutes the predetermined breaking point. Here, it is possible to break out a portion forming the projectile from the membrane which is larger than the cross-section of the guide channel. According to the invention, the cross-section of the guide channel is preferably set to a value which ensures that the maximum working pressure generated in the gas vessel after the gas generating material has been activated is below a specific value, preferably lower than 300 to 400 bar.

According to another embodiment of the invention, the outlet membrane may be configured and designed such that it is destroyed as soon as a critical pressure of the mixture of stored gas and gas generated is exceeded in the gas vessel even without being destroyed by the projectile. This guarantees the operational reliability of the gas generator, as the gas generator is triggered even if the outlet membrane of the gas vessel is not destroyed by the projectile because of malfunction.

The wall thickness of the gas vessel may be designed for the maximum working pressure (in case of destruction of the outlet membrane by the projectile) or the critical pressure at which the outlet membrane is destroyed, also considering a safety reserve. This leads to a decrease in weight and manufacturing costs of the gas generator without impairing the operational reliability or safety thereof.

In the preferred embodiment, the gas vessel may be tube-shaped. The guide channel may be provided in a disk-like end piece that is connected with the corresponding end of a tube or is integrally formed therewith.

The combustion chamber, too, may be tube-shaped; preferably, a tube section forming the housing of the combustion chamber is connected with the end piece of the gas vessel or is integrally formed therewith. Hereby, a very slim design is achieved with little constructional efforts.

According to a further embodiment of the invention, the outlet opening of the combustion chamber may be shielded from the solid or liquid particles produced when gas is generated by means of a shielding element. The shielding element is arranged in front of the outlet opening of the combustion chamber at a predetermined distance thereto.

The shielding element avoids that the solid or liquid particles are ejected directly without reducing their speed. The particles can then only emerge from the outlet opening of the combustion chamber if they are entrained in the stream of gas which is forcibly deviated.

In an embodiment of the invention, the shielding element may be configured as a sieve or filter. Hereby, it is at least avoided that solid or liquid particles exceeding a specific size will emerge.

Preferably, the shielding element comprises a rebounding or impact portion which covers the outlet opening of the combustion chamber in such a way that a direct, straight entrance of solid or liquid particles into the outlet opening of the combustion chamber without reducing the speed thereof or their direct striking of the membrane is avoided.

In a further embodiment of the invention, the portion surrounding the outlet opening of the combustion chamber and/or the rebounding portion of the shielding element, which are subjected to being hit by solid or liquid particles, may consist of a material in which some of the particles penetrate and remain trapped and from which some of the particles rebound, potentially after having burst once they hit the aforesaid portions. By this, it is achieved that large particles are either crushed and obtain a size that does not pose any problems or remain trapped.

BRIEF DESCRIPTION OF THE DRAWINGS

In the following, the invention is explained in greater detail with the aid of embodiments illustrated in the drawings, in which

FIG. 3 shows a longitudinal section of a rear portion of a second embodiment of a gas generator without a separate projectile; and FIG. 4 shows a longitudinal section of a rear portion of a third embodiment without a separate projectile.

DESCRIPTION OF PREFERRED EMBODIMENTS

Figure 1:
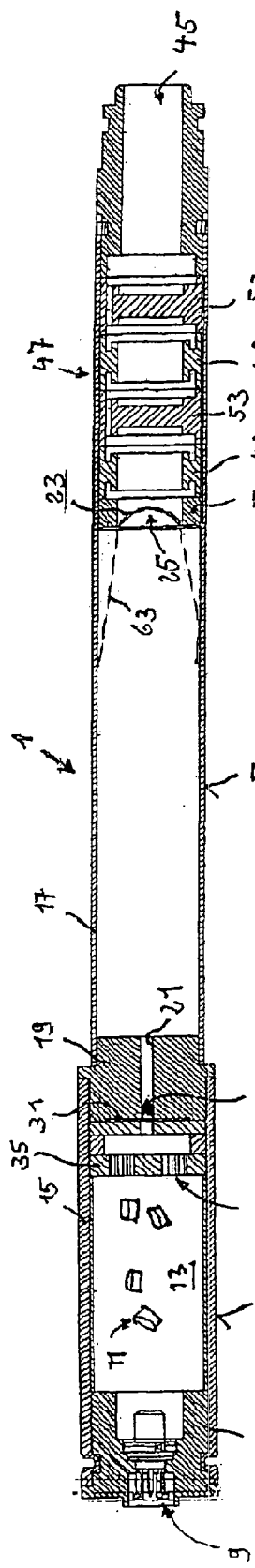
FIG. 1 shows a first embodiment of a hybrid gas generator according to the invention in longitudinal section.

The hybrid gas generator 1 shown in FIG. 1 comprises a combustion chamber 3 and a gas vessel 5. At its rear end, the combustion chamber 3 is closed by a disk-like stopper 7; in the stopper 7, an activating device 9 is arranged for activating a gas generating material 11 which is contained in the interior space 13 of the combustion chamber 3. The activating device 9 is preferably configured as an igniter which is controllable by an electric signal. The axially extending wall of the combustion chamber 3 is preferably configured as a tube section 15, as is shown in FIG. 1.

The gas vessel 5, whose axially extending outer wall may also be configured as a tube section 17, has a rear end facing the combustion chamber 3 which is connected with a disk-like end piece 19 in which—preferably extending along the axis of the tube section 17—a guide channel 21 is formed. The end piece 19 is connected with the front end of the tube section 15 of the combustion chamber 3, too. Connecting the stopper 7 and the end piece 19 with the tube sections 15 and 17 may be effected by welding, for example. These elements may consist of metal or a suitable plastic material. Instead of the multi-component construction shown in FIG. 1, the elements mentioned can of course also be completely or partially formed as one piece.

Forming the combustion chamber 3 with a plastic housing has the advantage that it is easy and cost-efficient to manufacture. The combustion chamber may also be formed as an exchangeable cartridge which may be detachably connected with the gas vessel 5. As the plastic material for the above-mentioned elements which may consist of plastics, PEEK or PE are particularly suitable. PEEK is a very heat-resistant plastic material, which, however, is relatively expensive. Although PE is less heat-resistant in the long run, it has an effect of self-protection if it is heated for a relatively short time: as a result of heating, part of the surface of the PE, which also has a relatively high proportion of water, evaporates. This produces a cooling effect (transpiration cooling) which protects the material from being destroyed at least for a short time.

In the front end portion of the gas vessel 5, an outlet membrane 23 is provided which sealingly closes an outlet opening 25 of the gas vessel 5. In the embodiment illustrated, the outlet membrane 23 is held in a disk-like closure element 27 which is arranged in the front end portion of the tube section 17 of the gas vessel 5 and is sealingly connected therewith. The closure element 27 in its turn may consist of metal or plastics and may be welded to the tube section 17 or may integrally be formed therewith. The outlet membrane 23 is preferably arranged at the inner front wall of the closure element 27 and is sealingly connected with this wall by welding, for example.

In the embodiment shown in FIG. 1, a separate projectile 29 is provided in the guide channel 21 of the end piece 19 of the gas vessel 5. The projectile 29 is preferably held in the guide channel 21 by small frictional forces so that it cannot fall out of the guide channel 21 when the gas generator 1 changes its position. On the rear face surface of the end piece 19, an outlet membrane 31 of the combustion chamber is provided. This membrane may consist of metal or plastics and is sealingly connected with the end piece consisting of metal or plastics preferably by a ring-shaped weld which extends around the cross-section of the guide channel 21. In the interior space 13 of the combustion chamber 3, a first particle retention or removing device 33 is provided in front of the opening of the guide channel 21 which is closed by the outlet membrane 31 of the combustion chamber. The particle removing device 33 comprises a disk-like shielding element 35 which contains a rebounding portion 37. The rebounding portion 37 covers the opening of the guide channel 21 covered by the membrane 31 so as to avoid that solid or liquid particles produced when gas is generated in the interior space 13 of the combustion chamber 3 directly penetrate into the guide channel 21 or that the particles hit the membrane 31 in the area of the opening of the guide channel 21. In order to make it possible for the gas generated in the combustion chamber 3 to penetrate into the gas vessel 5 through the guide channel 21, the shielding element comprises through holes 39 and is arranged in front of the membrane 31 or the opening of the guide channel 21 at a predetermined distance. Because of the finite thickness of the shielding element 5 or the finite length of the through-holes 39, the stream of particles flowing through them cannot hit the membrane 31 directly in the area of the opening of the guide channel 21 or enter into the guide channel 21. The through holes can be chosen to have such a small cross-section that a filtering function is achieved at the same time.

Figure 2A:
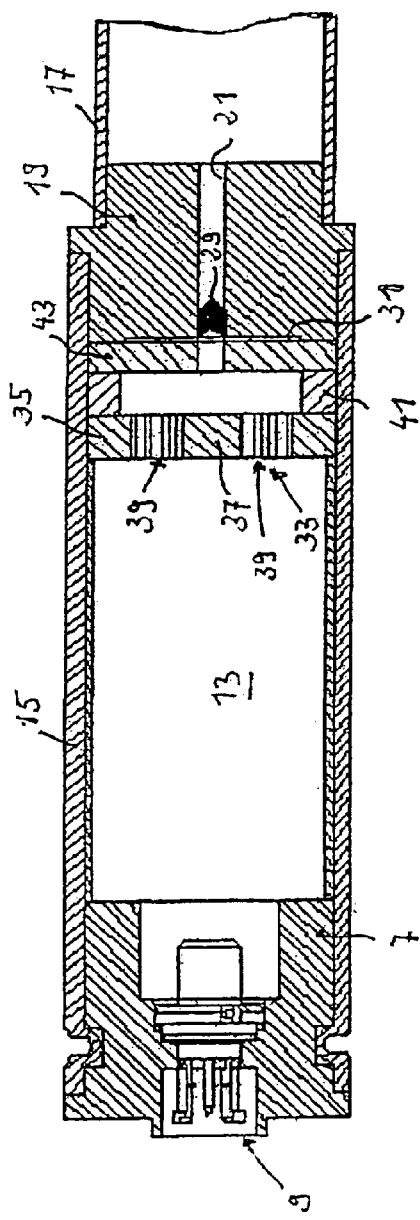
FIG. 2a shows an enlarged illustration of the rear portion of the embodiment shown in FIG. 1.

In the embodiment illustrated in FIGS. 1 and 2, in order to obtain a defined distance between the shielding element 35 and the end piece 19, a spacer ring 41 and a rebounding plate 43 are used, which contains a centric opening aligned with the guide channel 21 in the end piece 19.

The rebounding plate 43 consists of a material which makes the particles passing through the through holes 39 of the shielding element 35 burst when they hit the plate so that they obtain a size that does not pose a problem, or the material is made such that those particles which do not burst penetrate into the rebounding plate 43 and are trapped thereby.

The particle removing device 33 thus ensures that the membrane 31 is not destroyed by solid or liquid particles before a specific threshold pressure is reached. Furthermore, the particle removing device 33 avoids that high-energy particles pass through the guide channel 21.

In the following, the function of the hybrid gas generator shown in FIGS. 1 and 2 is briefly explained: After the activating device 9 has been activated or a corresponding igniter has been ignited, the gas generating material 11 contained in the interior space 13 of the combustion chamber 3 is activated. The generation of gas causes an increase in pressure in the interior space 13. With respect to its thickness and its material, depending on the cross-section of the guide channel 21, the outlet membrane 31 of the combustion chamber is dimensioned such that the membrane is destroyed in the area of the cross-section of the guide channel 21 at a predetermined threshold pressure within very exacting tolerances. This destruction may be a simple bursting of the membrane 31. The projectile 29 held in the guide channel 21 is suddenly acted upon by the corresponding threshold pressure after the membrane 31 has been destroyed. Hereby, the projectile 29 is accelerated in an extremely defined manner and is guided in the guide channel 21 over the entire barrel length until it exits from the guide channel. The barrel length is the length of the guide channel 21 through which the projectile passes from its starting position in the guide channel 21 until it exits from the guide channel 21. Apart from other factors (pressure acting upon the projectile, mass of the projectile, etc.), the barrel length determines the final speed of the projectile 29 when it exits from the guide channel 21.

In order to ensure that the projectile 29 is accelerated in an optimal way, the projectile is preferably formed such that the outer wall of the projectile 29 forms a substantially sealing closure with the inner wall of the guide channel 21. For this purpose, the projectile 29 may comprise a recess in its rear portion so that the residual outer walls in the area of the recess are acted upon by the pressure of the gas generated and are pressed against the inner wall of the guide channel 21. This results in a sealing effect without substantially decelerating the projectile in the guide channel 21 because of inadmissibly high frictional forces and without requiring an additional sealing device or additional sealing means such as an O-ring for the projectile.

The projectile 29 is ejected from the guide channel 21 with a predetermined final speed and flies towards the destructible outlet membrane 23, which it destroys when it hits it. As a result, a mixture of the stored gas contained in the gas vessel 5 and the gas generated in the combustion chamber 3, which flows into the gas vessel 5 when the projectile 29 exits from the guide channel 21, escapes from the outlet opening 45 of the gas generator 1. The mass flux of the gas mixture escaping from the outlet opening 45 as a function of time depends on the pressure in the interior space of the gas vessel 5, which in turn depends on the flow resistance between the outlet opening 25 of the gas vessel 5 and the outlet opening 45 of the gas generator 1 as well as the mass flux of the gas generated which enters into the interior space of the gas vessel 5 through the guide channel 21. The maximum pressure in the combustion chamber 3 may be 700 to 1.500 bar, for example, and the maximum pressure in the interior space of the gas vessel 5 may be 300 to 400 bar. For this reason, it is possible to form the outer walls of the gas vessel 5 to be clearly thinner or weaker than the outer walls of the combustion chamber 3.

For safety reasons, the outlet membrane 23 may be dimensioned such that it is destroyed when a predetermined critical pressure is exceeded and unblocks the outlet opening 25. A situation of this kind may occur in case of malfunction of the gas generator or a false assembly of the generator without the projectile 29, for example. The critical pressure at which the membrane 23 is destroyed is appropriately higher than the normal maximum working pressure which is generated inside the gas vessel 5 if the gas generator functions correctly.

In the front portion of the gas generator 1, a second particle removing device 47 is provided. This device comprises several disk-shaped elements which have the effect that the stream of gas escaping is deviated, respectively. In the embodiment illustrated, the second particle removing device is formed of two different types of disk-like elements. A first type of the disk-like elements 49 is substantially formed by a ring whose centric through opening 49a allows the stream of gas including the particles still existing therein to pass through it axially. In the walls on the front side of the disk-like elements 49, annular grooves 51 are formed. As will be explained later, the annular grooves 51 form removing recesses for solid or liquid particles hitting the surfaces of the grooves. The second type 53 of the disk-like elements does not have a centric through opening, but several through openings 55 positioned radially outwardly. When a disk-like element 53 is seen in a plan view, the radially outward through-holes may be formed as several bores arranged on a circular line.

Figure 2B:
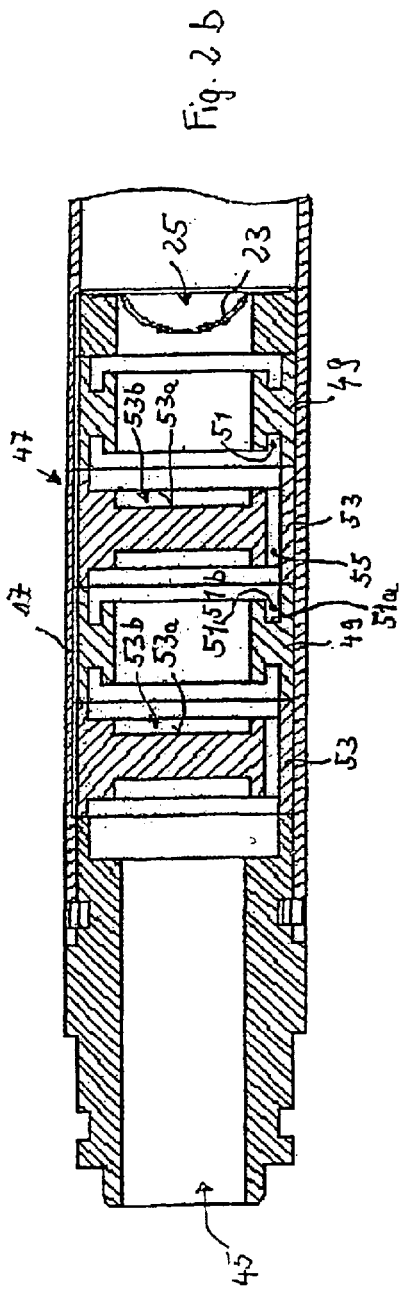
FIG. 2b shows an enlarged illustration of the front portion of the embodiment shown in FIG. 1.

As illustrated in FIGS. 1 and 2b, after the outlet membrane 23 has been destroyed, the stream of gas first passes through one disk-like element 49 or its centric through-hole 49a and then hits the centric portion of a disk-like element 53 arranged behind the first one, which only comprises through-holes 55 which are displaced radially outwardly. This first disk-like element 53 simultaneously serves to catch the projectile 29.

The stream of gas is therefore deviated from its at first substantially axial path into a substantially radial direction and passes through the through-holes 55 of the disk-like element 53 displaced radially outwardly. The centric portion of the disk-like elements 53 may again be formed as a rebounding portion 53a, as has already been described in connection with the rebounding portion 43. Furthermore, the rebounding portion 53a may be provided at the bottom of a recess so that the recess has the effect of a removing portion 53b in which particles may deposit. Having passed through the through-holes 55 of the disk-like element 53, the stream of gas has to be deviated again (two times) in order to be able to pass through the centric through opening 49a of the second disk-like element 49 in a substantially axial direction again The cross-section of the through-holes 55 may be chosen such that a filtering function is achieved at the same time. When the stream of gas is deviated from the parallel-axial direction when it passes through the through-holes 55 of the disk-like element 53 into a substantially radially inward direction, particles are trapped in the annular groove 51 of the second disk-like element 49, as the particles cannot follow the rapid deviation of the gas stream, at least if they exceed a certain mass. The interior space of the annular groove 51 thus serves as a removing portion 51a. At least the inner wall at the front side of the annular groove 51 or the entire element 49 can consist of a material which allows high-energy particles to penetrate into it and catches them or makes the particles hitting the material burst. Thus, the annular groove 51 simultaneously forms a rebounding portion 51a and a removing portion 51b. Instead of an annular groove 51, which serves as a common rebounding portion or removing portion for all through-holes 55, separate rebounding portions or removing portions may of course be assigned to each through-hole or several through-holes, respectively.

In the embodiment shown in FIGS. 1 and 2, the stream of gas passing centrically through the second disk-like element 49 is again deviated in such a way that it can pass through the radially outward through-holes 55 of the second disk-like element 53. The centric portion of the element 53 again serves as a rebounding portion 53a and a removing portion 53b. Having passed through the through-holes 55 of the second disk-like element 53, the stream of gas leaves the gas generator 1 through the centric outlet opening 45 in the front portion of the gas generator 1. The gas generator 1 may be formed such that a gas bag to be inflated, e.g. an air bag, may be mounted therein.

Instead of large centric portions in the disk-like elements 49, a plurality of small through-holes may also be provided in this area which act as a filter, or a sieve-like element may be inserted in the centric through-hole.

The embodiment of a particle removing device 47 illustrated in FIGS. 1 and 2 has the advantage that it is made of only two different components (the disk-like elements 49 and 53). Apart from the advantage of a cost-efficient realization, this results in a simple assembly which is not susceptible to failure.

Of course, however, the particle removing device 47 just like the particle removing device 33 may also be realized in arbitrary other ways; in any case, it is necessary that the stream of gas containing the particles is deviated at least once, and at least one rebounding portion and/or removing portion is required, which is provided substantially in the elongated direction of the stream of gas before it is deviated.

FIG. 3 shows a longitudinal section of a rear portion of another embodiment of a gas generator according to the invention, which is largely identical with the embodiment shown in FIGS. 1 and 2. Thus, like reference numerals are used for like parts.

In the following, for reasons of simplicity, only different parts and different functions of this embodiment are explained in greater detail.

In the embodiment shown in FIG. 3, no separate projectile (29 in FIG. 1 and FIG. 2a) was used. In this embodiment, instead of a separate projectile, a membrane 31' which seals off the guide channel 21 on the side of the combustion chamber is provided. The membrane 31' is formed such that, when a predetermined threshold pressure is exceeded in the interior space 13 of the combustion chamber 3, substantially the entire part of the membrane closing the cross-section of the guide channel is broken out of the membrane in one piece and acts as a projectile. Depending on the material and the desired threshold pressure, the membrane 31' may have a predetermined thickness for this purpose. The edges of the end piece 19, which delimit the cross-sectional opening of the guide channel 21, may be configured to be sharp-edged so that they contribute to shearing off the portion of the membrane 31' which covers the cross-section of the guide channel 21. For this purpose, the edge of the opening of the guide channel 21 may have an acute angle of less than 90°. To achieve this, a circumferential annular groove 57, for example, may be formed directly adjacent the edge of the guiding channel on the front side of the end piece 19, which results in a shearing edge 59 having an acute angle.

Breaking out the part of the membrane 31' which closes the guide channel 21 in one piece makes it possible to use this part as a projectile, which is accelerated in the way described above as a result of the pressure acting on it, being guided in the guide channel 21. The further function of this embodiment is identical with the function of the embodiment in FIG. 1 explained above. The embodiment according to FIG. 3 has the advantage of a more simplified manufacture.

Of course, the membrane 3' may not only be provided on the front side of the end piece 19 on the side of the combustion chamber, but also inside the element 19. For this purpose, this element may consist of two disks, for example, which enclose the membrane 3' between them.

The further embodiment illustrated in FIG. 4 differs from the embodiment according to FIG. 3 in that the membrane 3' is provided on the front side of the end piece 19 opposite the combustion chamber. In this case, too, the membrane 3' may be connected with the end piece 19 by providing a ring-shaped weld 61. The function or operation of the embodiment according to FIG. 4 differs from that of the embodiment according to FIG. 3 in that, when gas is generated in the interior space 13 of the combustion chamber 3, the membrane 31' is not only broken out in the area of the cross-sectional opening of the guide channel 21, but the entire portion present inside the ring-shaped weld 61 is broken out. This portion may be larger than the cross-sectional opening of the guide channel 21. In this embodiment, however, the part of the membrane 31' which is broken out in one piece is not guided, i.e. the barrel length is reduced to zero in this case. As a result, the hitting accuracy and the final speed of the projectile are less or lower in this case than in the embodiment according to FIG. 3. In this embodiment, the disadvantage of a reduced hitting accuracy can be overcome by guiding surfaces 63 (outlined in FIG. 1) which guarantee that a projectile "moving in the wrong direction" is guided towards the membrane 23 to be destroyed. The guiding surfaces 63 may be realized by a ring-shaped element (not illustrated in greater detail) inside the gas vessel 5, which comprises a centric through-hole conically tapering in the direction of the membrane 23.

In this case (as in the embodiments described above), the guide channel 21 or the length thereof serves to "decouple" the respective retroactions of the dynamic pressures in the interior space of the gas vessel 5 and in the interior space 13 of the combustion chamber 3. The length of the guide channel is chosen to be preferably larger than the diameter of the cross-section and smaller than approximately five times the diameter of the cross-section. In this way, one achieves that a simple computer-aided simulation is possible when developing a gas generator for very specific fields of application, without requiring a large number of experiments.

A further remark that may be made in this context is that the barrel length for a projectile (separate projectile 29 or projectile that has been "broken out") guided in the guide channel 21 should be at least one time the diameter of the projectile in order to achieve sufficient guidance.

In the gas generator according to the invention, if the guide channel or barrel has corresponding dimensions, it has the additional effect that a narrow, sharply limited jet of gas is created which enters into the gas vessel from the combustion chamber. By suitably dimensioning the guide channel, the length of the club-like jet and the diameter thereof as well as the opening angle of the jet can be determined in such a way that the gas escaping from the combustion chamber and the stored gas contained in the gas vessel are mixed through well. The ratio of the diameter or cross-section of the guide channel and the diameter or cross-section of the gas vessel is preferably in the range of $\frac{1}{10}$ to $\frac{1}{5}$.

In an embodiment not illustrated in greater detail, in which no separate projectile according to FIGS. 1 and 2 is used and the projectile is realized by a fragment which has been broken out of the membrane substantially in one piece, the fragment to be broken out may be thickened in comparison to the residual membrane. If desired, this makes it possible to obtain a higher mass of the projectile. Alternatively, the membrane as a whole may be configured to be thicker and provided with a predetermined breaking point, preferably an annular groove. The predetermined breaking point makes it possible for the fragment to be broken out at the desired threshold pressure, which is so low that the fragment would not be broken out without the predetermined breaking point. Both these measures make it possible to obtain a higher mass of the projectile broken out of the membrane, irrespective of whether the membrane is provided at the inlet opening of the guide channel (here, the shearing effect of shearing edges described above may be used additionally) or whether the membrane is provided on the side of the outlet opening of the combustion chamber opposite to the combustion chamber. Of course, both measures may also be combined with each other (irrespective of the positions of the membrane).

What is claimed is:

1. A hybrid gas generator, in particular for filling a gas bag, the hybrid gas generator including:
   (a) a combustion chamber which contains a predetermined amount of a gas generating material and which includes an outlet opening of the combustion chamber;
   (b) an activating device for activating the gas generating material;
   (c) a gas vessel containing a stored gas, which is connected with said combustion chamber via said outlet opening of the combustion chamber, the gas vessel being sealed off in an initial state, and including at least one outlet opening for a gas mixture which is sealed off by means of an outlet membrane in the initial state;
   (d) wherein gas that is generated in said combustion chamber after said gas generating material has been activated acts upon a projectile via said outlet opening of the combustion chamber, which projectile is accelerated by the gas pressure and destroys said outlet membrane, whereby the gas mixture consisting of the gas generated and the stored gas escapes from said outlet opening;
   (e) said outlet opening of the combustion chamber runs into an interior space of said gas vessel via a guide channel having a predetermined length,
   (f) said projectile is configured as a projectile which is separate in the initial state and is provided in said guide channel, said projectile being located in said guide channel such that it keeps a distance from an outlet opening of said guide channel by a predetermined barrel length in the initial state, and (g) a membrane is provided between said projectile and said combustion chamber, which, as soon as a predetermined threshold pressure of the gas generated in said combustion chamber is exceeded, is destroyed by this pressure, whereby said projectile is immediately acted upon and accelerated by the pressure of the gas generated which exceeds the threshold pressure.

2. A gas generator according to claim 1, wherein said projectile includes a preferably centric or ring-shaped recess in its end that is to be acted upon by the accelerating pressure, and wherein the remaining outer wall of said projectile is formed such that it is pressed against an inner wall of said guide channel, being deformed elastically or plastically, when the recess is acted upon by the accelerating pressure, so as to create a sealing effect.

3. A hybrid gas generator, in particular for filling a gas bag, the hybrid gas generator including:

(a) a combustion chamber which contains a predetermined amount of a gas generating material and which includes an outlet opening of the combustion chamber;

(b) an activating device for activating the gas generating material;

(c) a gas vessel containing a stored gas and being connected with said combustion chamber via said outlet opening of the combustion chamber, the gas vessel being sealed off in an initial state, and including at least one outlet opening for the gas mixture which is sealed off by means of an outlet membrane in the initial state;

(d) wherein the gas that is generated in said combustion chamber after said gas generating material has been activated acts upon a projectile via said outlet opening of the combustion chamber, which projectile is accelerated by the gas pressure and destroys said outlet membrane, whereby the gas mixture consisting of the gas generated and the stored gas escapes from said outlet opening;

(e) wherein said outlet opening of the combustion chamber runs into an interior space of said gas vessel via a guide channel having a predetermined length; and (f) wherein said guide channel is closed by a membrane in the initial state, the membrane being formed such that at least the part of the membrane is broken out in one piece and acts as a projectile once a predetermined threshold pressure of the gas generated in said combustion chamber is exceeded.

4. A gas generator according to claim 3, wherein said membrane has such a thickness in the area of the cross-section of said guide channel or is thickened as compared to the residual portion of said membrane that the part of the membrane forming the projectile has a mass which is large enough to ensure that the kinetic energy of the projectile suffices to destroy the outlet membrane upon impact.

5. A gas generator according to claim 3 wherein said membrane is provided at the end of said guide channel on the side of the combustion chamber or inside said guide channel, with the portion of said guide channel between the position of said membrane and the end of said guide channel serving as a barrel length for guiding said projectile.

6. A gas generator according to claim 3 wherein said membrane is acted upon by shearing edges on its front side opposite to said combustion chamber.

7. A gas generator according to claim 3 wherein said membrane is provided on a front side of said guide channel opposite the combustion chamber or at the outlet opening of the combustion chamber.

8. A gas generator according to claim 3 wherein means fordefining a closed, ring-shaped predetermined breaking point are provided in a front side of said membrane.

9. A gas generator according to claim 8, wherein said membrane is connected with the front side of an element containing the guide channel by means of a ring-shaped weld, with the edge portion of the weld on the inside defining the predetermined breaking point.

10. A gas generator according to claim 1 or 3 wherein the cross-section of said guide channel is set to a value which ensures that the maximum working pressure generated in said gas vessel after said gas generating material hHas been activated is below a predetermined value.

11. A gas generator according to claim 5 wherein the barrel length for the projectile is determined to be such that the kinetic energy of the projectile is sufficient to securely destroy said outlet membrane when the projectile hits it under a driving force provided by the gas generated in said combustion chamber.

12. A gas generator according to claim 1 wherein said outlet membrane is configured and designed such that it is destroyed as soon as a critical pressure of the mixture of stored gas and gas generated is exceeded in said gas vessel even without being destroyed by said projectile.

13. A gas generator according to claim 1 wherein a the pressure resistance, in particular the wall thickness, of said gas vessel is designed for the maximum working pressure or the critical pressure in consideration of a safety reserve.

14. A gas generator according to claim 1 wherein said gas vessel is configured to be tube-shaped.

15. A gas generator according to claim 14, wherein said guide channel is provided in a disk-like end piece.

16. A gas generator according to claim 15, wherein said combustion chamber is configured to be tube-shaped, wherein a tube section forming the housing of the combustion chamber is connected with the end piece of said gas vessel or is integrally formed therewith.

17. A gas generator according to claim 1 wherein the outlet opening of the combustion chamber is shielded from the solid or liquid particles produced when gas is generated by means of a particle removing device, which is arranged in front of the outlet opening of the combustion chamber.

18. A gas generator according to claim 17, wherein said particle removing device comprises a shielding element configured as a sieve or a filter.

19. A gas generator according to claim 18, wherein said shielding element comprises a rebounding portion which covers the outlet opening of the combustion chamber in such a way that a direct, straight entrance of solid or liquid particles into the outlet opening of the combustion chamber or their direct striking of said membrane is avoided.

20. A gas generator according to claim 17 wherein at least the portion surrounding the outlet opening of the combustion chamber or said rebounding portion of said shielding element, which are subjected to being hit by solid particles, consist of a material in which some of the particles penetrate and remain trapped and from which some of the particles rebound.

21. A gas generator according to claim 3 wherein said outlet membrane is configured and designed such that it is destroyed as soon as a critical pressure of the mixture of stored gas and gas generated is exceeded in said gas vessel even without being destroyed by said projectile.

22. A gas generator according to claim 3 wherein a pressure resistance, in particular the wall thickness, of said gas vessel is designed for the maximum working pressure or the critical pressure in consideration of a safety reserve.

23. A gas generator according to claim 3 wherein said gas vessel is configured to be tube-shaped.

24. A gas generator according to claim 23, wherein said guide channel is provided in a disk-like end piece.

25. A gas generator according to claim 24, wherein said combustion chamber is configured to be tube-shaped, wherein a tube section forming the housing of the combustion chamber is connected with the end piece of said gas vessel or is integrally formed therewith.

26. A gas generator according to claim 3 wherein the outlet opening of the combustion chamber is shielded from the solid or liquid particles produced when gas is generated by means of a particle removing device, which is arranged in front of the outlet opening of the combustion chamber.

27. A gas generator according to claim 26, wherein said particle removing device comprises a shielding element configured as a sieve or a filter.

28. A gas generator according to claim 27, wherein said shielding element comprises a rebounding portion which covers the outlet opening of the combustion chamber in such a way that a direct, straight entrance of solid or liquid particles into the outlet opening of the combustion chamber or their direct striking of said membrane is avoided.

29. A gas generator according to claim 27 wherein at least the portion surrounding the outlet opening of the combustion chamber or said rebounding portion of said shielding element, which are subjected to being hit by solid particles, consist of a material in which some of the particles penetrate and remain trapped and from which some of the particles rebound.

* * * * *